Nov. 17, 1970   T. F. BRENNEMAN ET AL   3,541,394
PROXIMITY TRANSDUCER
Filed Jan. 10, 1969
2 Sheets-Sheet 1
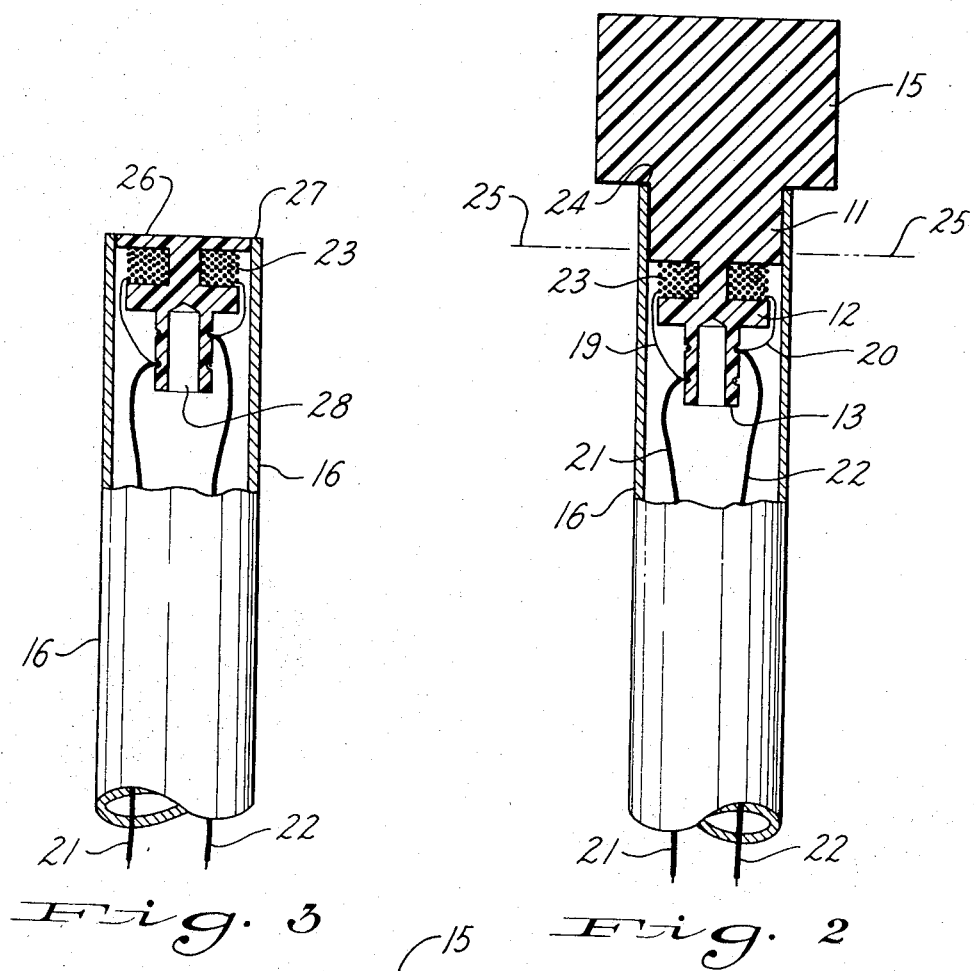
INVENTORS.
TERRELL F. BRENNEMAN
DONALD F. HAYS, JR
ROBERT S. MORROW
BY
Harry B. Keck
ATTORNEY Nov. 17, 1970     T. F. BRENNEMAN ET AL     3,541,394
PROXIMITY TRANSDUCER
Filed Jan. 10, 1969     2 Sheets-Sheet 2

INVENTORS.
TERRELL F. BRENNEMAN
DONALD F. HAYS, JR
ROBERT S. MORROW
BY Harry B. Keck
ATTORNEY United States Patent Office 3,541,394
Patented Nov. 17, 1970

3,541,394
PROXIMITY TRANSDUCER
Terrell F. Brenneman, Columbus, Donald F. Hays, Jr., Westerville, and Robert S. Morrow, Columbus, Ohio, assignors to IRD Mechanalysis, Inc., Worthington, Ohio, a corporation of Ohio
Continuation-in-part of application Ser. No. 697,099, Jan. 11, 1968. This application Jan. 10, 1969, Ser. No. 790,231
Int. Cl. H01f *15/04, 27/00*
U.S. Cl. 317—99                                     3 Claims

ABSTRACT OF THE DISCLOSURE

A proximity transducer having an open-ended cylindrical metal sleeve with a nonmetallic mandrel at the forward open end. The mandrel has an uninterrupted planar forward end which is coplanar with the end of the sleeve. Also, there is a coil of fine wire in a circumferential groove between the forward end and the rearward end. The ends of the wire are connected to conductors within the sleeve extending toward the rear end of the sleeve.

CROSS-REFERENCES TO RELATED APPLICATIONS

See copending application Ser. No. 697,079, now abandoned, filed on Jan. 11, 1968 by Glen H. Thomas and assigned to the assignee of the present invention. This application is a continuation-in-part of Ser. No. 697,099 filed on Jan. 11, 1968, now abandoned.

BACKGROUND OF THE INVENTION (1) Field of the invention.—This invention relates to a fabrication and assembly technique for producing a proximity transducer of the type having a coil of fine wire mounted adjacent to and coaxial with a metal sleeve. Such proximity transducers are described in the above-mentioned copending patent application of Glen H. Thomas filed on Jan. 11, 1968.

(2) Description of prior art.—Heretofore proximity transducers of the type having a coil of fine wire as the detecting element have not been surrounded by a metallic sleeve. Instead, the coils have been adhered to a supporting structure, such as a tube or sleeve, by an adhesive substance, such as a plastic resinous mass. The benefits accruing from shielding the fine wire coil with a metallic sleeve have been described in copending application S.N. 697,079, by Glen H. Thomas, supra. Initial efforts to produce such proximity transducer devices in a reproducible manner accruing from shielding the fine wire coil with a metallic sleeve have been described in copending application S.N. 697,079, by Glen H. Thomas, supra. Initial efforts to produce such proximity transducer devices in a reproducible manner proved difficult since each inductive probe had its own response characteristic and required independent calibration by the manufacturer. The probes thus were not interchangeable.

The need for interchangeability of the inductive probe which is used in a proximity transducer system is clear. These probes are intended for installation in a variety of locations, for example, in the bearings of large rotating machines, such as electrical power generators. It is desirable that the probes remain in position and that the single measuring device be available for observing the instantaneous indications from each of the permanently mounted probes. Thus, the response characteristic of the probes must be essentially reproducible from unit to unit.

SUMMARY OF THE INVENTION

A mandrel is provided having a forward portion and a rear portion. A circumferential groove is provided in the mandrel between the rearward portion and the forward portion to receive a coil of fine wire. The free ends of the coil are extended from the groove toward the rearward portion where they are connected to larger coductors. The diameter of the forward portion corresponds with the inner diameter of the metal sleeve which is provided to shield the coil. The metal sleeve is intentionally longer than required. The mandrel with coil is inserted into the metal sleeve with the forward portion peripherally engaged with the inner surface of the metal sleeve. The mandrel and the sleeve are secured preferably by mans of an adhesive encapsulating material deposited within the bore of the sleeve. Thereafter, the forward portion of the metal sleeve and the excess material of the mandrel are cut away as a unit. The fine wire coil is presented rigidly with respect to the metal sleeve and coaxial therewith adjacent to the freshly cut off forward rim of the metal sleeve. Additional quantities of the forward rim of the metal sleeve and the forward portion of the mandrel can be machined away as a unit until the inductive probe exhibits the response characteristic desired for the units.

Two embodiments of the present proximity transducer are described herein. In the preferred embodiment, the mandrel is essentially cylindrical and has a pair of opposed lengthwise peripheral grooves extended from the circumferential groove to the end of the rearward portion. In the alternative embodiment, the mandrel includes the forward portion and the rearward portion and also a central portion. The circumferential groove is disposed between the forward and central portions. The forward potion has a greater diameter than the central portion; the central portion has a greater diameter than the rearward potion.

BRIEF DESCRIPTION OF THE DRAWINGS

FIG. 1 is a perspective illustration of a mandrel employed in manufacturing one embodiment of the present inductive probe;

FIG. 2 is a cross-section illustration of the mandrel of FIG. 1 mounted in a circular metal sleeve;

FIG. 3 is a cross-section illustration of the inductive probe of FIG. 2 in its final assembled form;

DESCRIPTION OF THE PREFERRED EMBODIMENTS

Figures 5, 6, 7, 8:
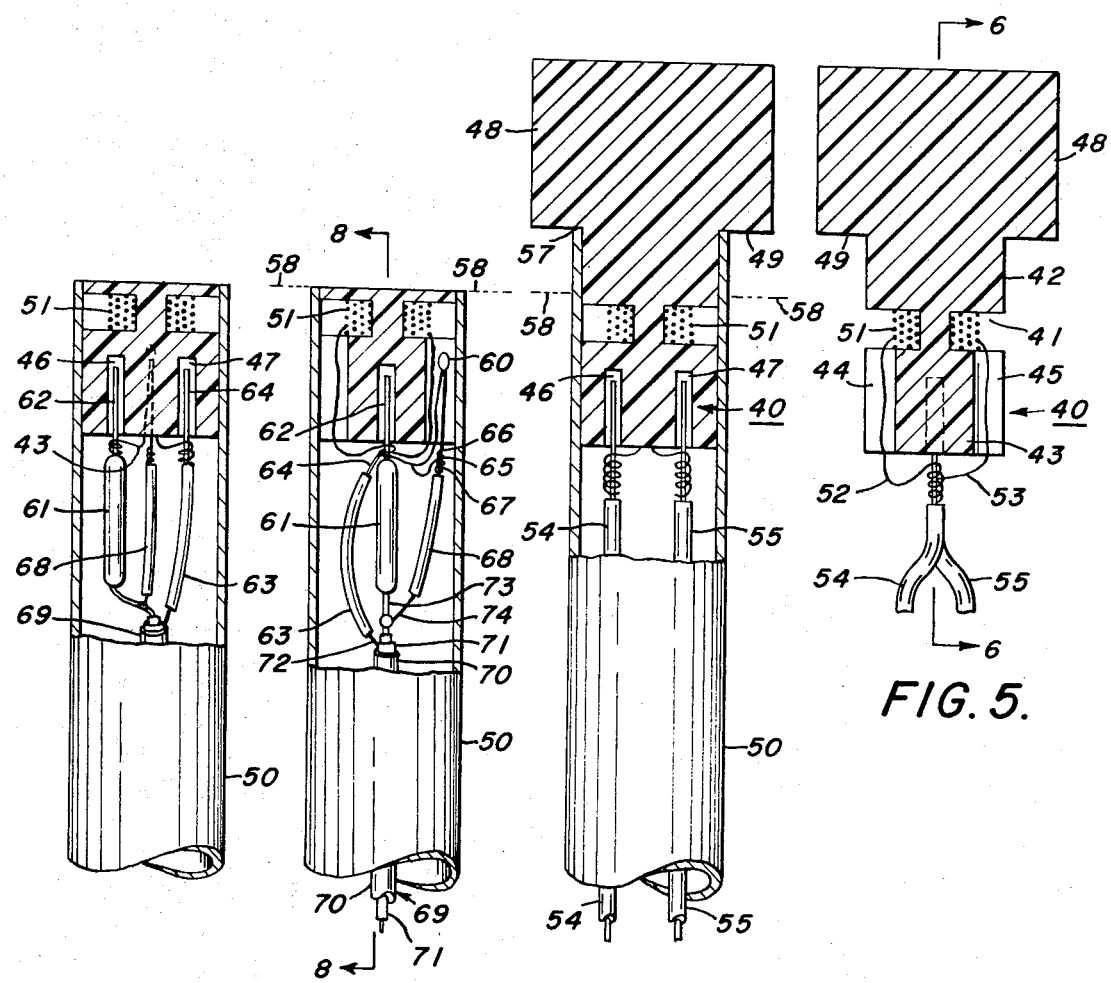
FIG. 5 is a cross-section view of the assembled mandrel of FIG. 4 prior to insertion in a cylindrical metal sleeve.
FIG. 6 is an illustration partly in cross-section of the mandrel of FIG. 5, taken along the line 6—6 after the assembled mandrel has been inserted in a cylindrical metal sleeve.
FIG. 7 is a view, partly in cross-section, of a further embodiment of this invention.
FIG. 8 is a view, partly in cross-section, taken along the line 8—8 of FIG. 7.
Figure 4:
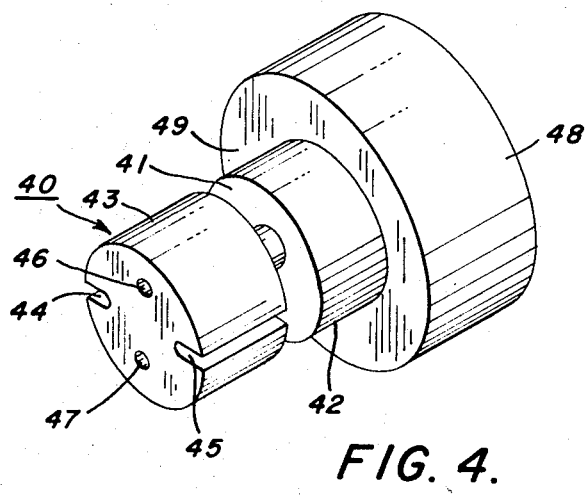
FIG. 4 is a perspective illustration of a mandrel which is useful in a preferred embodiment of this invention.

The present inductive probe includes a cylindrical mandrel or bobbin which is preferably formed from suitable non-conductive plastic materials, such as polyvinyl fluoride, nylon, polycarbonate resins, melamine resins and the like. Glass-fiber filled rods are especially useful for bobbin production. The bobbin, identified by the numeral 10, is illustrated in FIG. 1. The bobbin includes a forward portion 11, a central portion 12 and a rearward portion 13. A circumferential groove 14 is provided between the central portion 12 and the forward portion 11. An enlarged cylindical spool 15 is provided forwardly of the forward portion 11. The cylindrical spool 15 has a larger diameter than the forward portion 11. The forward portion 11 has a larger diameter than the central portion 12. The central portion 12 has a larger diameter than the rearward portion 13. A pair of circumferential groove 17, 18 is provided in the rearward portion 13. The outer diameter of the forward portion 11 corresponds to the inner diameter of a metallic sleeve which constitutes the housing for the proximity transducer coil. The metallic sleeve is illustrated in FIG. 2 and is identified by the numeral 16.

The nonmetallic bobbin 10 is provided with a coil 23 of fine wire in the circumferential groove 14. Typically 100 to 150 turns of size 42 wire constitutes a suitable inductance for the proximity transducer. The free ends 19, 20 of the wire forming the coil are brought out around the central portion 12 and taped or otherwise secured in the circumferential grooves 17, 18, one free end in each of the grooves. Electrical wires 21, 22 are secured to the free ends 19, 20, respectively, within the corresponding circumferential grooves.

The length of the forward portion 11 is sufficient to recess the coil 23 rigidly within the forward edge 24 of the metal sleeve 16 which is in abutment with the cylindrical spool 15. The wires, 21, 22 extend through the sleeve 16, but spaced-apart from the inner wall thereof, to electrical connections which for no part of the present invention. The interior of the sleeve 16 preferably is filled with an encapsulating material, such as epoxy resin, to adhere the bobbin 10 within the sleeve 16 and to rigidize the fine wire conductor free ends 19, 20 and the wires 21, 22.

Thereafter, the cylindrical spool 15 and the contiguous mass of the forward portion 11 and the forward end of the sleeve 16 are cut away as a unit along a plane which is indicated by the dotted line 25 of FIG. 2. The cutting preferably is done on a lathe with a cutting tool having close tolerances. The thickness of the residual mass 26 of the forward portion 11 (FIG. 3) is slightly in excess of 0.010 inch. Thus, the coil 23 is disposed substantially flush with the forward rim 27 of the metal sleeve 16. The coil 23 is rigidly retained within the sleeve 16 and is coaxial therewith. The inductive probe shown in FIG. 3 thereupon can be evaluated to determine its response characteristic and additional shavings of the residual forward portion 26 of the bobbin along with the shavings from the forward rim 27 can be removed until the inductive probe achieves the response characteristic which is desired. In all instances, the desired response characteristic will be approached by trimming and cutting away as a unit materials from forward portion 26 from rim 27.

When inductive probes are manufactured in the manner herein described, they are uniform in response characteristic and are extremely rugged, resisting impact shocks and corrosion exposures.

Typically, the metal tube 16 has an inner diameter of 0.1875 inch and an outer diameter of 7/32 inch. The outer diameter of a typical coil 23 is 0.150 inch. Thus, the annular spring between the coil 23 and the metal tube 16 is about 0.01875 inch. The metal sleve may be aluminum alloy, steel, copper. Excellent results have been obtained with 2024–T4 aluminum alloy tubing.

It will further be observed from inspection of FIGS. 2 and 3 that the bobbin 10 may be equipped with a central well 28 which can receive a small sensing element in the form of a thermocouple, a thermistor or other condition-sensing device to provide an indication of or a compensation for the temperature in which the coil 23 is disposed.

A preferred embodiment of this invention, shown in FIGS. 4 through 8, utilizes a non-metallic bobbin 40 of essentially uniform outer diameter corresponding to the inner diameter of the metal cylindrical sleeve. A circumferential groove 41 separates the forward portion 42 from the rearward portion 43. The rearward portion has lengthwise peripheral grooves 44, 45 extending over its entire length from the circumferential groove 41 to the end of the bobbin. The rearward portion 43 also has one or more bores 46, 47 parallel to the cylindrical axis of the bobbin. The bores 46, 47 extend over less than the entire length of the rearward portion 43. An enlarged cylindrical spool 48 is provided at the forward end of the forward portion 42 to serve as a convenient handle for the bobbin during assembly operation and to provide a shoulder 49 for abutment of a metal cylindrical sleeve 50. A coil 51 of fine wire is wrapped in the circumferential groove 41 and the two free ends 52, 53 are brought to the rear end of the mandrel in the longitudinal grooves 44, 45. Insulated conductors 54, 55 have the ends stripped of insulation and the exposed conductor tips are inserted into the bores 46, 47 to provide a firm anchor for the conductors 54, 55 and to allow convenient wrapping of one wire end 52, 53 to one of the conductors 54, 55, respectively. Preferably, the wound connections are secured by soldering. The assembled bobbin of FIG. 5 is placed within a cylindrical metal sleeve 50 as seen in FIG. 6 and the forward rim 57 of the sleeve 50 is abutted against the shoulder 49 of the spool 48. The interior of the sleeve is filled with a suitable encapsulating substance, such as a hardenable epoxy resin. Thereafter, the spool 48 and the forward end of the forward portion and the forward rim 57 of the sleeve are cut along the plane indicated by the broken line 58. Further cutting of the forward tip is carried out until the resulting transducer has the desired response characteristic.

A further refinement of the invention shown in FIGS. 7 and 8 employs a thermistor and resistor within the sleeve serving as a temperature-compensating feature as described in copending U.S. patent application S.N. 697,109, filed Jan. 11, 1968, and assigned to the assignee of this invention. A thermistor 60 is provided within the cylindrical peripheral groove 44 and a fixed resistor 61 has one wire lead 62 inserted in a bore hole 45. A conductor 63 having a stripped end 64 is inserted in the bore hole 47. One coil lead 43 is wrapped around the wire lead 62. The other coil lead 44 is wrapped around the conductor stripped end 64. One lead 65 from the thermistor 60 is wrapped around the resistor lead 62. The other thermistor lead 66 is wrapped around a stripped end 67 of the conductor 68. A length of shielded cable 69 has a shield 70 and a central insulated conductor 71. The shield is soldered to the other stripped end 72 of the conductor 63. The central conductor 71 is soldered to the other resistor lead 73 and to the stripped end 74 of the conductor 68. The structure, thus assembled, is inserted into the cylindrical metal sleeve 50 and the sleeve is filled with an encapsulating substance. The forward end of the assembly is cut away along the line 58 as in FIG. 6 and is further cut until the desired response characteristics are achieved for the transducer.

What is claimed is:

1. A proximity transducer having an open-ended cylindrical metal sleeve;

a non-metallic mandrel at the forward open end of said sleeve;

said mandrel having an uninterrupted planar forward end and a rearward end, of which the said forward end is coplanar with the forward open end of said sleeve;

a circumferential groove in the said mandrel between said forward end and said rearward end;

a coil of wire wrapped about the said mandrel and disposed within said circumferential groove;

the ends of the wire from said coil extended toward the said rearward end, and spaced-apart from the said sleeve;

conductor means within said sleeve extending toward the rear end of said sleeve;

electrical connections between said ends of the wire and the said conductor means;

said mandrel being rigidly secured within the said sleeve;

2. A proximity transducer according to claim 1 wherein the said rearward portion of the mandrel has two longitudinal peripheral grooves and the said ends of the wire are disposed one each in the said peripheral grooves, and a therimstor is disposed in one of the said peripheral grooves.

3. A proximity transducer according to claim 1 wherein the said mandrel has a central portion disposed between the said forward portion and the said rearward portion;
the said circumfenential groove is disposed between the said forward portion and the said central portion;
the said forward portion has an outer diameter corresponding to the inner diameter of said sleeve and larger than the outer diameter of the said central portion;
the outer diameter of the said central portion is larger than that of the said rearward portion;
the said rearward portion is provided with two circumferential, spaced-apart grooves; and
the said ends of the wire are delivered over the surface of the central portion and are secured one each in the said two cricumferential, spaced-apart grooves.

References Cited

UNITED STATES PATENTS

| | | | |
|---|---|---|---|
| 2,375,309 | 5/1945 | McCoy | 336—208 |
| 2,556,973 | 6/1951 | Nickells | 336—208 XR |
| 2,949,591 | 8/1960 | Craige | 336—208 XR |
| 2,976,502 | 3/1961 | Hill | 336—90 |
| 3,308,411 | 3/1967 | Roshala | 336—30 |
| 3,234,491 | 2/1966 | Baur | 336—198 XR |
| 3,278,877 | 10/1966 | Kameya et al. | 36—198 XR |
| 3,304,599 | 2/1967 | Nordin | 336—83 XR |

THOMAS J. KOZMA, Primary Examiner

U.S. Cl. X.R.

29—605; 336—84, 179, 192, 208